United States Patent [19]

Himelstein et al.

[11] Patent Number: 4,661,810

[45] Date of Patent: Apr. 28, 1987

[54] METHOD FOR INTERACTIVE ROTATION OF DISPLAYED GRAPHIC OBJECTS

[75] Inventors: Carol S. Himelstein; John S. Wang, both of Austin, Tex.

[73] Assignee: International Business Machines Corporation, Armonk, N.Y.

[21] Appl. No.: 703,073

[22] Filed: Feb. 19, 1985

[51] Int. Cl.$^4$ .............................................. G09G 1/14
[52] U.S. Cl. ..................................... 340/709; 340/706; 340/710; 340/727
[58] Field of Search ............... 340/706, 707, 709, 710, 340/723, 727; 364/521; 273/DIG. 28

[56] References Cited

U.S. PATENT DOCUMENTS

| | | | |
|---|---|---|---|
| 4,116,444 | 9/1978 | Mayer et al. | 340/709 |
| 4,504,918 | 3/1985 | Axmann | 340/709 |
| 4,533,911 | 8/1985 | Finegold | 340/727 |

FOREIGN PATENT DOCUMENTS 0105138  6/1984  Japan .................................. 340/709

OTHER PUBLICATIONS

"The Lisa Computer System", BYTE, Feb. 1983, pp. 33-50, Gregg Williams.
"Computer Graphics Tutorial", edited by Kellogg S. Booth, IEEE Computer Society, 1979, One Touch Input of Vector Information for Computer Displays.

Primary Examiner—Gerald L. Brigance
Assistant Examiner—Jeffery A. Brier
Attorney, Agent, or Firm—Richard E. Cummins

[57] ABSTRACT

A method is described for editing a graphic object being displayed by an interactive draw graphic system. The method is directed to a rotate edit action on a graphic object that can be selected from a group of individual objects that are being concurrently displayed in an overlaid fashion on the same screen. The method permits the operator to move the cursor that is involved in the object selection task away from the object after the object selection task is completed so that the cursor can be positioned in an uncluttered area of the screen. The direction of movement of the cursor is along the line extending from the center of the object through a point or line segment of the object that was adjacent the cursor the time the object was selected. When cursor motion is under the control of an input device, such as a mouse, the operator's efficiency and accuracy is increased since the desired amount of rotation becomes easier to obtain as the distance between the object and the cursor increases.

9 Claims, 8 Drawing Figures

METHOD FOR INTERACTIVE ROTATION OF DISPLAYED GRAPHIC OBJECTS

TECHNICAL FIELD

This invention relates in general to interactive information handling systems and, in particular, to an improved method for assisting the operator of such a system to rotate a displayed graphic object.

BACKGROUND ART

Interactive information handling systems generally comprise a microprocessor or personal computer, a keyboard which is used by the operator to enter information into the system, a display device which functions to display information selectively to the operator, a storage device which may include a diskette drive and a removable diskette for storing information such as programs and data that is handled by the system, and lastly, a printer for providing hard copy output of information that has been generated by the system. Some interactive information handling systems are packaged as an integrated product and are referred to as intelligent work stations. Others are arranged as a combination of individual cable-connected components. In still other arrangements, the processor storage and printer may be shared among a number of operators that are provided with so-called "dumb" terminals, each consisting of a display device and a keyboard which are connected through a suitable communication link to the processor.

Information handling systems are referred to as interactive when the nature of the application that is being run by the system requires an almost continual interaction between the operator and the system. The information entered into the system by the operator through the keyboard, i.e., the sequence of keystrokes, is interpreted by the system in accordance with the position of the cursor on the display device of the system and the current state of the system. Similarly, the system's response to the operator, i.e., the information displayed to the operator is dependent on the nature of the information supplied by the operator.

Interactive information handling systems are capable of running several different types of applications, such as text processing application, data base application, spreadsheet application, etc. Currently, many of these applications are being marketed for interactive information handling systems which employ a personal computer for running the programs. The commercial success of these programs is highly dependent on how "user friendly" the program appears to the operator. It is therefore important for the program to provide a relatively simple interface to the operator since, in many situations, the operator will not have much experience in operating computers.

The prior art discloses a number of graphic application programs for use with an interactive information handling system. One type of graphic program functions to convert statistical type data into pie charts, bar graphs, etc., and is referred to as business graphics. Another type of graphic application program provides the operator with the ability to actually draw graphic objects on the display screen. These application programs are sometimes referred to as "interactive draw graphics" applications. In such systems, the operator draws by controlling the movement of the cursor through either the cursor control keys on the keyboard or by a cursor locator device, such as a "mouse" or data tablet. In some systems a library of graphic objects is provided from which the operator can select a given object and modify that object to obtain the desired appearance. The operator, therefore, quite often "builds" a complex graphic object by combining and modifying a number of previously drawn simpler objects. The modifying of a previously drawn graphic object is referred to as editing and, as in text editing, there are a number of different editing actions. Text editing actions such as insert, delete, move, and copy are also provided for graphic objects. In addition, there are several editing actions that are unique to graphics, such as scale up/scale down, stretch/shrink, and rotate.

The editing function for graphic objects generally involves two aspects. The first is the selecting of the particular editing action, e.g., move, copy, or rotate and the second is the selection of the object to be edited with that action. Editing actions such as move, copy, and rotate require the operator to input into the system a distance value associated with the edit action. In many graphic editing applications, that value is entered into the system by movement of the cursor. In other words, the object is moved or rotated a distance which is proportional to the movement of the cursor from some given point. Cursor movement is controlled by cursor keys on the keyboard or by a mouse device. Both devices operate satisfactorily when the edit action involves movement of the graphic object from one location to another. However, a number of problems arise where the object is to be rotated about its central point. The first problem stems from the fact that the graphic object which is to be rotated has usually been selected by moving the cursor adjacent to a line segment that defines a portion of the graphic object, and advising the system, by actuation of one of the mouse keys, that this is the object of interest that is to be rotated. At this point, the operator would move the mouse in a circular direction and the object would be rotated a corresponding amount. Some prior art systems would even provide a display adjacent to the cursor which indicates the running value of the rotation that has occurred up to that point.

If the distance between the center of the object and the point where the cursor latched on to the object is relatively short, the ability of the operator to rotate the object a precise number of degrees and minutes was drastically reduced since a small rotation of the mouse resulted in a relatively large rotation of the object. On the other hand, if the distance was relatively long, then the accuracy of the rotation was increased. In addition, if the screen was displaying a relatively complex grouping of overlaid objects, the area adjacent the cursor where the amount of rotation is displayed becomes very confusing for the operator to interpret.

The present invention is directed to an improved method of rotating a graphic object that is displayed by an interactive draw graphic system so that the problems encountered by prior art arrangements are avoided.

SUMMARY OF INVENTION

The method of rotating a graphic object being displayed in an interactive draw graphic system is characterized by a step in the editing process that permits the operator, after having selected the graphic object to be rotated, to move the cursor on a substantially straight line in a direction away from the center of the object, thereby creating a longer rotational lever between the center of the object and the position of the cursor prior to rotation. The longer rotation lever allows better accuracy of rotation, since movement of the mouse a predetermined distance along an arc results in less rotation of the object as the length of the rotational lever increases. In addition, by permitting the operator to move the cursor, after selecting the object to be rotated, to a potentially less cluttered area, permits a clear understanding for the operator as to the amount of rotation that has occurred at any point in the editing operation without being distracted by lines of other objects.

It is therefore an object of the present invention to provide an improved method for rotating a displayed graphic object in an interactive draw graphic system.

Another object of the present invention is to provide an improved method for rotating a graphic object in which the operator is permitted to move the cursor away from the center of the object after the object has been selected and prior to initiating the rotation editing action.

Objects and advantages other than those mentioned above will become more apparent from the following description when read in connection with the drawing.

DESCRIPTION OF THE PREFERRED EMBODIMENT

Figure 1:
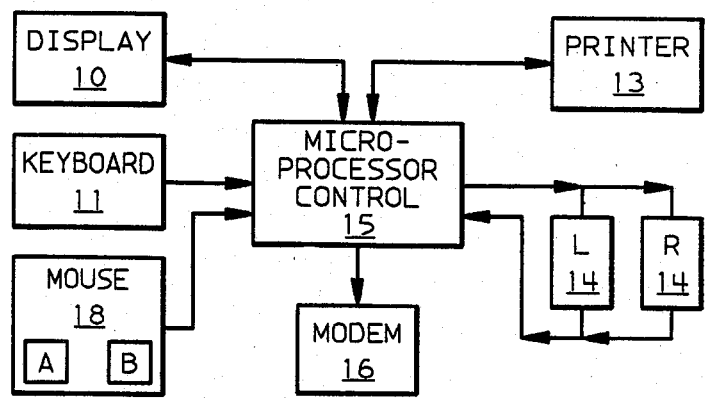
FIG. 1 is a block diagram of an interactive draw graphic system in which the present method may be advantageously employed.

FIG. 1 illustrates the general arrangement of a typical interactive information handling system in which the method of the present invention may be advantageously employed. The system shown in FIG. 1 comprises a display device 10 which comprises a conventional video field terminal for displaying information to the operator, a keyboard 11 which the operator uses to enter information and command data into the system, a printer 13 which functions to provide hard copy output of information selected by the operator, a pair of diskette drives 14L and 14R which function to transfer information between the system and the magnetic storage diskettes that are removably associated with the diskette drives and which store both program information and text and graphic information for the system. System components 10, 11, 13, 14L, and 14R are connected as shown in FIG. 1 to the microprocessor Block 15 which functions as the overall control of the system and interconnects the various system components to perform their specific functions at the appropriate time. The system of FIG. 1 also includes a modem 16 which functions to connect this system to other systems through various communication links.

Since the system of FIG. 1 is adapted to process graphic applications such as interactive draw type graphic programs, it should be assumed that the display device 10 is an all points addressable graphic display device in which each individual picture element (PEL) may be addressed, in contrast to text type displays, in which only a character box is addressable. Since interactive draw graphic applications are to be run by this system, an auxiliary input device 18 is also provided for providing more rapid positioning of the cursor on the screen than is obtainable by the cursor positioning keys on the keyboard 11. Such devices are well known in the art and, for purpose of the following description, it will be assumed that device 18 is a conventional "mouse" equipped with two buttons or keys, 18A and 18B. Devices having similar functions, such as data tablets could also be employed for the input device 18.

Figure 2:
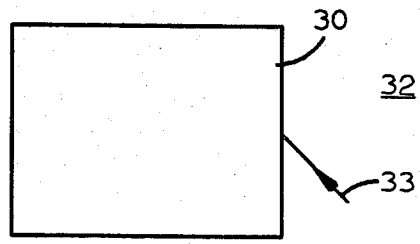
FIGS. 2 and 3 represent display screens, illustrating the rotation editing of a square graphic object in an uncluttered graphic space.
Figure 3:
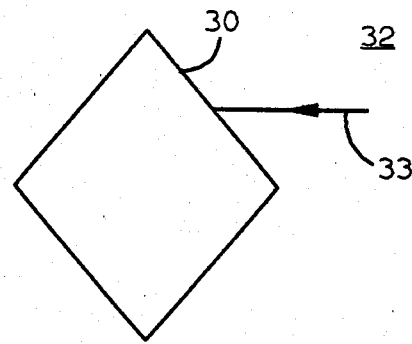
Figure 4:
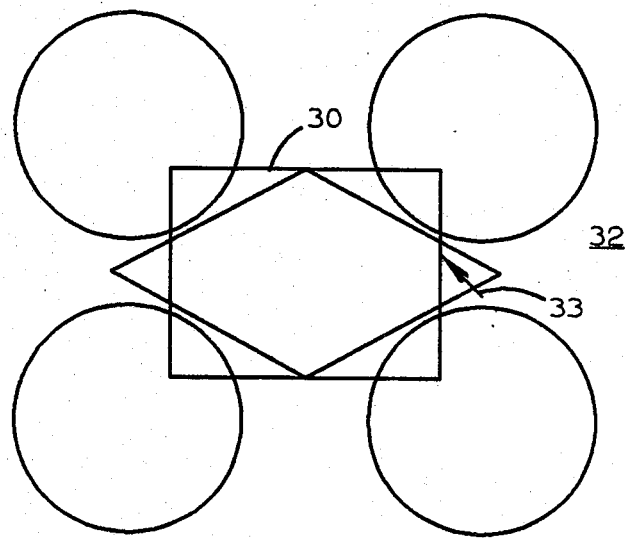
FIGS. 4-6 represent display screens, illustrating the rotation editing of a square graphic object in a cluttered space in accordance with the method of the present invention.

It should also be assumed that the system of FIG. 1 is provided with a suitable interactive draw graphic type program which permits the operator to draw graphic objects on the screen of device 10, similar to the objects shown in FIGS. 2 and 4. FIG. 2 is a diagrammatic representation of the screen of display device 10 shown in FIG. 1 at a point in the editing process where the object 30 has been selected for the rotate edit action. It should be assumed that the operator has selected object 30 in order to rotate it 45 degrees counterclockwise as shown in FIG. 2. FIG. 3 represents the screen shown in FIG. 2 after the object 30 has been rotated 45 degrees counterclockwise. In performing this edit action, the operator moves the mouse device in a counterclockwise, circular direction from the point that the object was selected while watching the screen for an indication at area 32, adjacent the pointer cursors 33, of the degrees of rotation that have occurred. When the system indicates to the operator that the object has been rotated the desired 45 degrees, the operator takes the appropriate action, such as releasing one of the mouse buttons to terminate the rotate edit operation.

FIG. 4 is a view of the screen shown in FIG. 2, except that six individual objects including object 30 from FIG. 2 are depicted in an overlaid fashion. It will be seen if the same editing operation is to be performed on object 30 in the same manner as was done in FIG. 3, namely, counterclockwise rotation of 45 degrees, the area of the display screen used to advise the operator of the amount of rotation that has occurred becomes somewhat obscured by the lines defining the other graphic objects.

Figure 5:
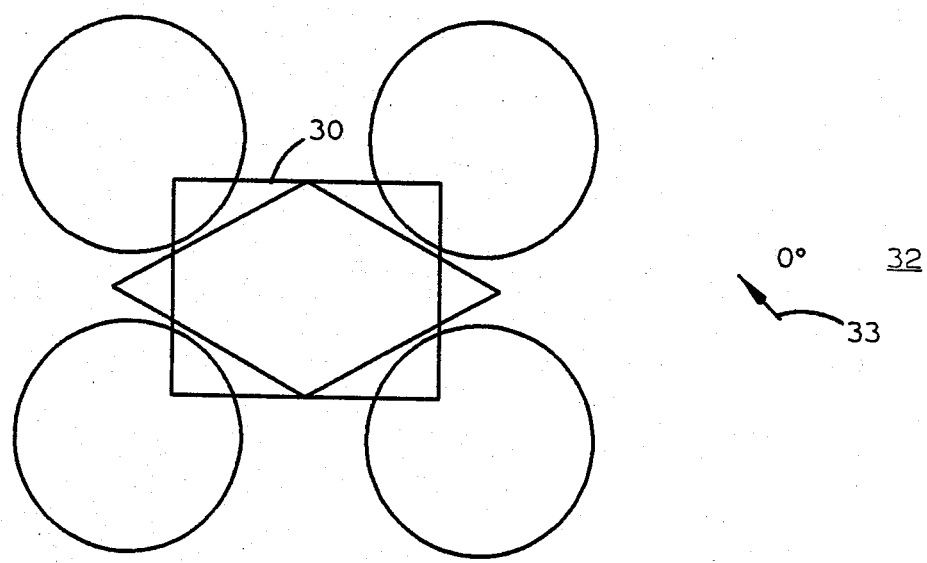
Figure 6:
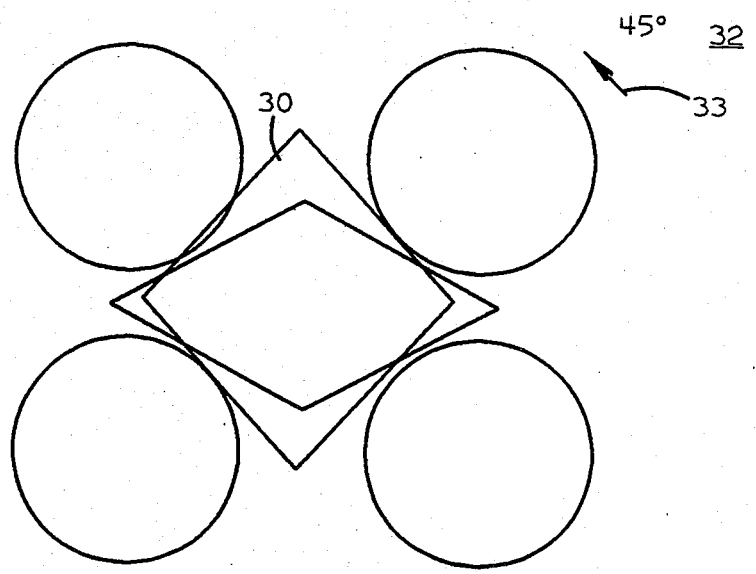

FIG. 5 illustrates the step which characterizes the improved editing method which is the subject of this application. As shown in FIG. 5, the pointing cursor has been removed or detached from the object 30 after the object 30 has been selected. Object 30, after being selected, is highlighted as represented by the somewhat darker lines which define object 30 in FIG. 4, even though the pointing cursor 33 has been moved in a general horizontal direction, away from the object 30. Movement of the pointing cursor to the location shown in FIG. 5 achieves two important advantages for the operator. First, the information being continuously fed back on the screen as to the amount of rotation of the object is readily viewable without any distractions from the other objects. Similarly, by increasing the length of the rotational lever, i.e., the line extending between the pointing cursor and the axis of rotation of object 30, the operator is provided with better control in obtaining the desired end results quickly. This occurs because, if the mouse is moved the same distance, the rotational effect on the object is less as the distance between the object and the pointing cursor is increased. It is, therefore, easier and faster for the operator to home in on the desired target. FIG. 6 illustrates object 30 after the rotation edit operation is completed.

Figure 7A:
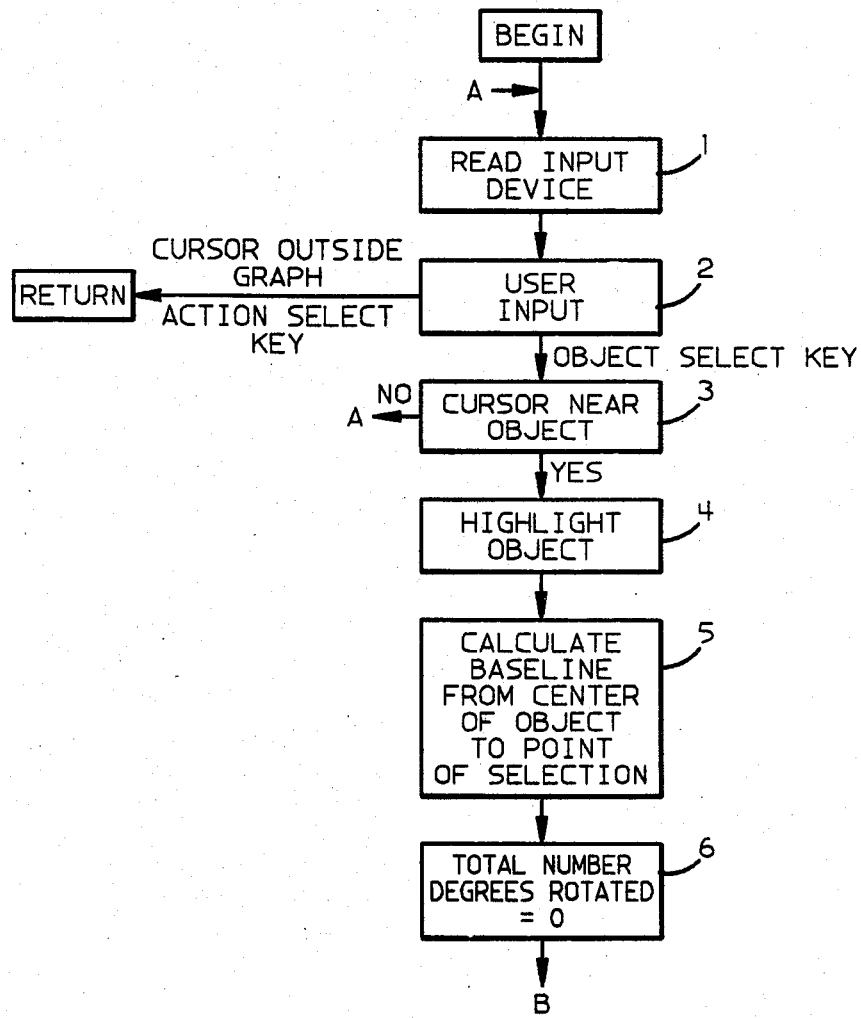
FIGS. 7a and 7b is a flowchart which sets forth the steps of the improved method of rotating the graphic object in accordance with the present invention.
Figure 7B:
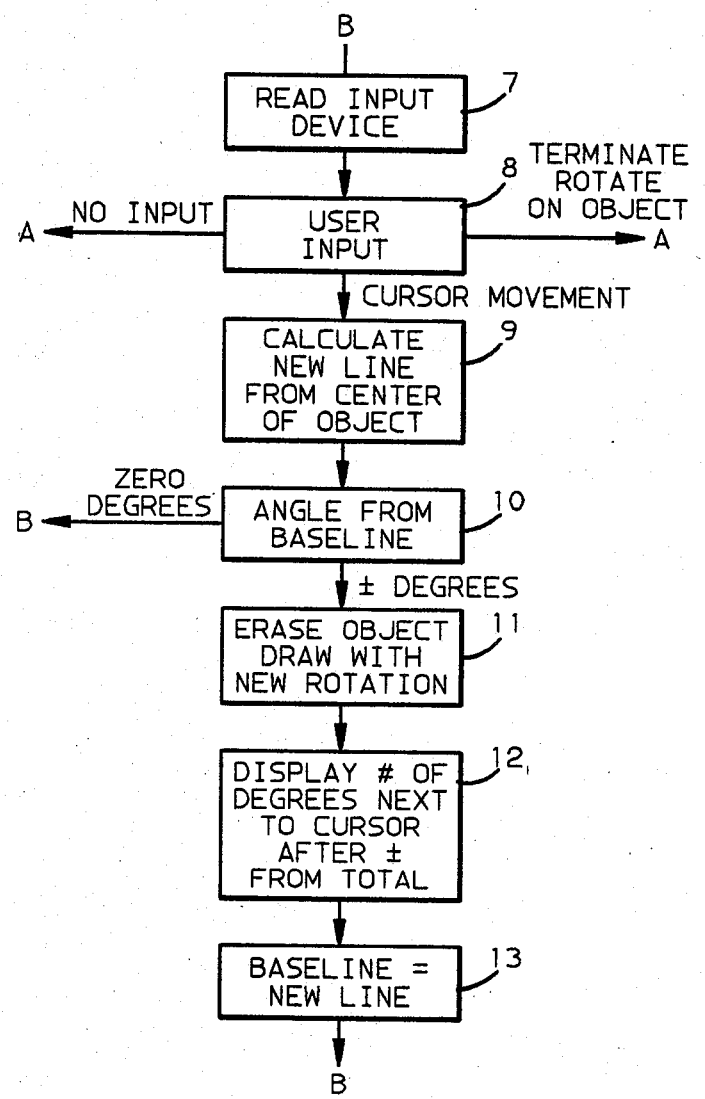

The manner in which the specific rotational edit operation illustrated in FIGS. 4–6 is performed by the system shown in FIG. 1 is set forth in the flowchart of FIGS. 7a and 7b.

Description of Flowchart

The starting point for this flowchart assumes that the user is currently editing a graphic space using the rotate implicit action. Control will stay in this flowchart until the user leaves the graphics space or changes to a different action.

Interactive graphics requires constant polling of the input device 18 in order to keep up with mouse movement and keyboard input. Block 1 in FIG. 7 represents the polling of a mouse and/or keyboard input device to get cursor motion data and keyboard data. Block 2 is a test on the input received in Block 1. If the operator has selected another action or moved the cursor out of the graphic space, then this routine will terminate. If the user has pressed the Select key in the mouse, then Block 3 will test to see if the current cursor position is close to any of the existing graphic objects. If the cursor is not close to any graphic objects, then control will go back up to Block 1.

If the cursor is close to a graphic object such as object 30 in FIGS. 2 or 4, then in Block 4 the object will be highlighted to set it apart from the other objects and to let the operator to see which object has been selected.

In order to determine the number of degrees for rotation, a baseline needs to be defined from which any rotation can be compared against. In Block 5 the definition of the baseline is done. This involves finding the center point of the object and the point at which the operator selected the object and determining the line between these two points.

A running total of the number of degrees that the object has been rotated is kept and can be displayed if the operator wishes, next to the Rotate cursor. Block 6 initialized the total number of degrees to zero.

Block 7 starts an inner loop that will stay in control so long as the operator is doing Rotate on the selected object. Again, constant polling must be done to keep up with operator input. Block 7 polls the input devices. Block 8 tests the input. If the operator indicated that the Rotate action was to end on this object, then control returns to the outer loop starting at Block 1. If the operator moved the mouse or pressed any cursor motion keys on the keyboard, then it is time to start rotating the object.

A new line must be calculated that can be compared with the original baseline to determine the amount of rotation. The new line is determined from the center of the object to the new cursor location. Block 9 does this calculation. Block 10 then compares the two lines to check for any difference in the angles. If there is no difference (i.e., zero degrees difference), then the operator has simply moved the cursor away from the object, possibly to a less cluttered spot on the screen. Rotation on this object is still in effect and control returns to the top of the inner loop in Block 7.

If there is a difference in the angles of the two lines, then the object must be rotated. The difference can be either positive or negative, depending on whether the operator moved the cursor clockwise or counterclockwise. Block 17 erases the copy of the object currently on the screen and re-draws the object with the new angular rotation applied to it. In Block 12, the total number of degrees rotated is updated to include the rotation just completed. In Block 13, the baseline is given the value of the new line so that now, rotation will be compared against the new line. Now it is time to start the inner loop again, starting at Block 7.

Set out below is an illustration of an application program useable by a processor of an interactive draw graphic system for doing the rotation of objects while allowing the cursor to be moved away from the object. This program is in program design language from which source and machine code are derivable. In the following, it is to be assumed that the system is under mouse and keyboard device control. The mouse controls the movement of a visible pointing cursor which allows the operator to determine the current cursor position on the screen.

The application calls a routine to query the mouse and/or keyboard input device to determine if a key has been pressed (CALL Read_Input_Device). Read_Input_Device will return the selected key and the current x, y location of the pointing cursor (CURSOR_X, CURSOR_Y).

At this point, A While loop is entered that retains control so long as the Action_Select_Key is not pressed and the pointing cursor is inside the graphics area.

The first step of the While loop is the check to see if the user pressed the OBJECT_SELECT_KEY. If so, a routine is called to determine if the current cursor position is close enough to a graphic object to select it (Close_To_Object). If the cursor is close enough, then a routine is called to highlight the object (Highlight_Object) to indicate to the user that the object has been selected. The center point of the object must be determined. This is to allow calculation of a line that will be the baseline from which the rotation will be done from (Call Calculat_Center). The baseline is then calculated (BASELINE=GET_Line). Get_Line will return the equation for the line between the center of the object and the point of selection on the object. Total_Degrees is a running count of the total number of degrees that the object has been rotated thus far. It is initialized to zero.

At this point, an inner While loop is entered that will retain control as long as the operator wishes to continue rotating the selected output. As soon as the operator indicates that the action is to stop on this object, then control returns to the outer While loop. The first step in the inner While loop is to read the input device (Call Read_Input_Device) to determine the status of the mouse and/or keyboard keys and the current x, y location of the cursor. If the application determines by comparing NEW_X and NEW_Y with CURSOR_X, CURSOR_Y that the pointing cursor moved Call Cursor_Motion), then new x and y are saved in CURSOR_X and CURSOR_Y and NEW_LINE is determined (NEW_LINE=Get_Line). The angle between baseline and new_line is determined (angle=Calculate_Angle).

If ANGLE is not zero (it can be positive or negative), the old copy of the object is erased (Call Erase_Object) and the object is re-drawn with the new rotation applied (Call Draw_Object). A running total of the number of degrees rotated is kept in Total_Degrees. The number of degrees of rotation in ANGLE is added to the previous total. The total number of degrees is then displayed next to the cursor (Call Display_Degrees). BASELINE is set to the value of NEW_LINE so that the baseline for rotation comparison is the last line calculated.

Action on this object is still in effect, so control returns to the top of the inner While loop.

```
PSEUDO CODE FOR THE ROTATE ACTION
IN INTERACTIVE DRAW GRAPHICS

Call Read_Input_Device (KEY, CURSOR_X, CURSOR_Y)
While (KEY <>Action _Select) and
(Inside_Graph_Space (CURSOR_X, CURSOR_Y))
if KEY = Select_Key then
if Close_To_OBJECT
(CURSOR_X, CURSOR_Y, OBJECT) then
Call Highlight_Object (Object)
Call Calculate_Center
(OBJECT, CENTER_X, CENTER_Y)
BASELINE:= Get_Line
(CENTER_X, CENTER_Y, CURSOR_X, CURSOR_Y)
TOTAL_DEGREES = 0
while KEY <>Terminate_Implicit_Action do
Call Read_Input_Device (KEY, new_x, new_y)
if Cursor_Motion
(CURSOR_X, CURSOR_Y, new_x, new_y) then
CURSOR_X = new_x
CURSOR_Y = new_y
NEW_LINE = Get_Line
(CENTER_X, CENTER_Y, CURSOR_X, CURSOR_Y)
ANGLE = Calculate_ANGLE
(BASELINE, NEW_LINE)
if ANGLE <>0 then
Call Erase_OBJECT (OBJECT)
Call Draw_OBJECT (OBJECT, ANGLE)
TOTAL_DEGREES= TOTAL_DEGREES + ANGLE
Call Display_Degrees (TOTAL_DEGREES,
CURSOR_X+offset,CURSOR_Y+offset)
endif ... BASELINE = NEW_LINE
endif
end    [of "while"]
Call Dehighlight_Object (OBJECT)
endif
endif
Call Read_Input_Device (KEY, CURSOR_X, CURSOR_Y)
end    [of "while"]
```

While the invention has been particularly shown and described with reference to the preferred embodiment thereof, it will be understood by those skilled in the art that various changes in the form and details may be made without departing from the scope and spirit of the invention.

We claim:

1. A method to assist the operator of an interactive draw graphic system having an operator positionable cursor to rotate from a first position to a second position a graphic object that includes a center point and that is defined by a plurality of line segments, said method comprising the steps of:

(a) displaying said object at said first position to said operator,
(b) establishing a positional relationship of said object for said system relative to a line extending between said cursor and said center of said object including the step of positioning said cursor adjacent one of said plurality of segments,
(c) moving said cursor away from said center point along a substantially straight line extending from said center point through said one line segment for a distance which is proportional to the degree of accuracy desired by said operator in said rotation of said object to said second position, and
(d) moving said cursor in a direction transverse to said straight line to rotate said object to said second position.

2. The method recited in claim 1, further including the step of displaying to said operator in an area adjacent said cursor, an indication of the amount, expressed in predetermined rotational units, that the object has been rotated during said step of moving said cursor in said transverse direction.

3. The method recited in claim 1 in which said system includes a mouse device, and said step of positioning said cursor further includes the step of moving said mouse in a direction and for distance to cause said cursor to be positioned adjacent said one line segment.

4. The method recited in claim 3 in which said mouse device includes at least one button, said step of displaying said object further includes the step of displaying other graphic objects concurrently with said object and further including the step of selecting said object by actuating said button when said cursor is adjacent to said object.

5. The method recited in claim 4 further including the step of advising said operator that an object has been successfully selected by highlighting said object.

6. The method recited in claim 5 in which said steps of moving said cursor relative to said center point of said object to rotate said object includes the step of moving said mouse for similar distances and directions.

7. The method recited in claim 6, further including the step of terminating said rotation and deselecting said object.

8. The method recited in claim 7 in which said step of terminating said rotation includes the step of said operator actuating said button on said mouse.

9. The method recited in claim 8 in which said step of moving said cursor after selecting said object, moves said cursor a distance sufficient to permit an unobstructed display of said indication and provides a finer control of said rotation for said operator.

* * * * *